US006917971B1

(12) United States Patent
Klein (10) Patent No.: US 6,917,971 B1
(45) Date of Patent: Jul. 12, 2005

(54) METHOD AND APPARATUS FOR DETERMINING A RESPONSE TIME FOR A SEGMENT IN A CLIENT/SERVER COMPUTING ENVIRONMENT

(75) Inventor: Paul F. Klein, Thousand Oaks, CA (US)

(73) Assignee: International Business Machines Corporation, Armonk, NY (US)

( * ) Notice: Subject to any disclaimer, the term of this patent is extended or adjusted under 35 U.S.C. 154(b) by 744 days.

(21) Appl. No.: 09/711,660

(22) Filed: Nov. 13, 2000

Related U.S. Application Data
(60) Provisional application No. 60/172,026, filed on Dec. 23, 1999.

(51) Int. Cl.[7] .................. G06F 15/173; G06F 15/16; G06F 15/00
(52) U.S. Cl. .................. 709/224; 709/233; 702/186
(58) Field of Search .................. 709/224; 702/186; 705/26; 370/252

(56) References Cited

U.S. PATENT DOCUMENTS

| 4,868,785 A | 9/1989 | Jordan et al. |
|---|---|---|
| 5,068,814 A | 11/1991 | Stark et al. |
| 5,483,468 A | 1/1996 | Chen et al. |
| 5,506,955 A | 4/1996 | Chen et al. |
| 5,511,185 A | 4/1996 | Weinbaum et al. |
| 5,519,438 A | 5/1996 | Elliott et al. |
| 5,553,235 A | 9/1996 | Chen et al. |
| 5,872,976 A | 2/1999 | Yee et al. |
| 5,953,708 A * | 9/1999 | Midorikawa et al. ......... 705/26 |
| 6,215,774 B1 * | 4/2001 | Knauerhase et al. ........ 370/252 |
| 6,446,028 B1 * | 9/2002 | Wang ......................... 702/186 |
| 6,560,648 B1 * | 5/2003 | Dunn et al. ................. 709/224 |
| 6,587,878 B1 * | 7/2003 | Merriam ..................... 709/224 |

FOREIGN PATENT DOCUMENTS

EP          0259224          8/1987

OTHER PUBLICATIONS

IBM Technical Disclosure Bulletin, "Method to Centralize Maintenance . . . Database," XP000313327, 35(2), 1992.
R. Snodgrass, "A Relational Approach to Monitoring Complex Systems," XP000071013, ACM Transactions on Computer Systems 6, 1988, 2, New York.

* cited by examiner

Primary Examiner—John Follansbee
Assistant Examiner—Philip Lee
(74) Attorney, Agent, or Firm—Gates & Cooper LLP (57) ABSTRACT

A method, apparatus, system, article of manufacture, etc. of determining response times for various computing segments is provided in accordance with one or more embodiments of the invention. Accordingly, the following segments in the execution of a computer program may be directly measured, computed, determined, or derived: total response time, client segment compute time, network segment trivial response time, network segment response time, server segment response time, and think time response time.

48 Claims, 5 Drawing Sheets

METHOD AND APPARATUS FOR DETERMINING A RESPONSE TIME FOR A SEGMENT IN A CLIENT/SERVER COMPUTING ENVIRONMENT

CROSS-REFERENCE TO RELATED APPLICATIONS

This application claims the benefit under 35 U.S.C. Section 119(e) of the following U.S. provisional patent application, which is incorporated by reference herein:

Provisional Application Ser. No. 60/172,026, filed Dec. 23, 1999, now abandoned, by Paul F. Klein, entitled "MEASURING RESPONSE TIME FOR VARIOUS SEGMENTS OF A STANDARD CLIENT/SERVER COMPUTING ENVIRONMENT BY DIRECTLY MEASURING ONE SEGMENT AND STATISTICALLY DERIVING RESPONSE TIME FOR THE REST".

This application is related to the following co-pending and commonly assigned patent applications, which applications are incorporated by reference herein:

U.S. patent application Ser. No. 09/428,271, filed Oct. 27, 1999 entitled "END-TO-END RESPONSE TIME MEASUREMENT FOR COMPUTER PROGRAMS USING STARTING AND ENDING QUEUES", by Paul F. Klein et al., now U.S. Pat. No. 6,202,036, issued Mar. 13, 2001, which application is a continuation of U.S. Pat. No. 5,991,705, issued on Nov. 23, 1999, application Ser. No. 08/899,195, filed Jul. 23, 1997, entitled "END-TO-END RESPONSE TIME MEASUREMENT FOR COMPUTER PROGRAMS USING STARTING AND ENDING QUEUES," by Paul F. Klein et al.; and U.S. patent application Ser. No. 09/428,262, filed Oct. 27, 1999 entitled "ROUND TRIP RESPONSE TIME MEASUREMENT FOR COMPUTER PROGRAMS", by Paul F. Klein et al., now U.S. Pat. No. 6,526,371, issued Feb. 25, 2003.

BACKGROUND OF THE INVENTION

1. Field of the Invention

The present invention relates generally to measuring response time for various segments of a standard client/server computing environment by directly measuring one segment and statistically deriving response time for the rest.

2. Description of the Related Art

In today's environment, it is common for desktop computers to run many different local and/or network applications simultaneously. Within such computing environments, it is not unusual for one application to execute significantly slower than other applications. Further, it is not uncommon for the operation of one application to seriously impact the performance of other applications on the computer. As a result, the user may have to wait an inordinate amount of time for applications to respond. The wait time experienced by a user is typically directly related to that user's productivity and business opportunity.

As more software applications and information are transferred via the Internet or are utilized on a network, determining performance of individual applications or network segments, based only on their observable behavior, becomes difficult. For example, a user may be unable to reliably detect whether abnormal performance for a specific application is the result of operations performed by that application, or whether it is the result of the impact from another application, or whether it is the result of the performance of the server or another remote system. Further, since each application may be able to perform many different kinds of processing, the user may have no idea that certain requests have significantly worse performance.

By having an ability to measure response time of each Client/Server segment in a computing environment, a decision can be made by the owner of the computing environment, as to which segment to investigate when a real-time delay should arise. Should one particular segment show signs of a delay, the owner of that computing segment can be called upon to do repairs or enhancements of that segment, reducing delays and ultimately making it operate that much faster. Thus, being able to get response time measurements of one or more segments in a computing environment is invaluable to the responsive operation of the total Client/Server computing environment.

For example, within the computer industry, different segments of a computer process directly relate to a standard industry model of a corporation's information technology structure. Corporations, as related to computing environments, may divide their information technology divisions into three logical parts: desktop management, network management, and application management. These divisions are typically run with different people and different skill sets. By measuring segment delays, delays within the three corporate divisions may be measured, thereby allowing the corporation to assign the correct expertise to manage the problems based on the segment in question. For example, if the client response time shows delays, then it is the responsibility of the desktop management division to solve the problem. For poor network response times, the network management division will be dispatched. Similarly, for delays in the server, the corporation's application management division would be responsible.

Currently, response time measurements in a segmented computing environment are hampered by the need to take measurements at each physical segment in question—which in most cases is not practical or even possible. Many of the segments to be measured are not in the physical realm of a measurement agent or the segment's design is such that a measurement agent would be ineffective because of a lack of an instrumentation point. In situations like this, the best that can be accomplished is to measure response time at a starting point segment giving what is known as the "Total Round Trip Response Time". The Total Round Trip Response Time measurement contains the summation of delays due to all computing segments but gives no information about delays in any specific segment. To reduce the Total Round Trip Response Time of any computing environment, the response time of one or more individual computing segments must be reduced.

SUMMARY OF THE INVENTION

To overcome the limitations in the prior art described above, and to overcome other limitations that will become apparent upon reading and understanding the present specification, the present invention discloses a method, apparatus, and article of manufacture for measuring response time of several related computing segments in a client/server computer environment.

The method derives, using a statistical method, the response time of several related segments in a client/server computing environment. A final segment, the total of all segment response times, is also computed. The segments that can be derived by a single direct measurement are client response time, network response time, server response time, total end-to-end response time, and client think time. Each of these segments is calculated and derived by directly measuring the client segment using a software measurement agent.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and in which is shown, by way of illustration, one or more embodiments of the invention. It is understood that other embodiments may be utilized and structural and functional changes may be made without departing from the scope of the present invention.

Overview

A method, apparatus, system, article of manufacture, etc. of determining response times for various computing segments is provided in accordance with one or more embodiments of the invention. Accordingly, the following segments in the execution of a computer program may be directly measured, computed, determined, or derived: total response time, client segment compute time, network segment trivial response time, network segment response time, server segment response time, and think time response time.

Hardware Environment

Figure 1:
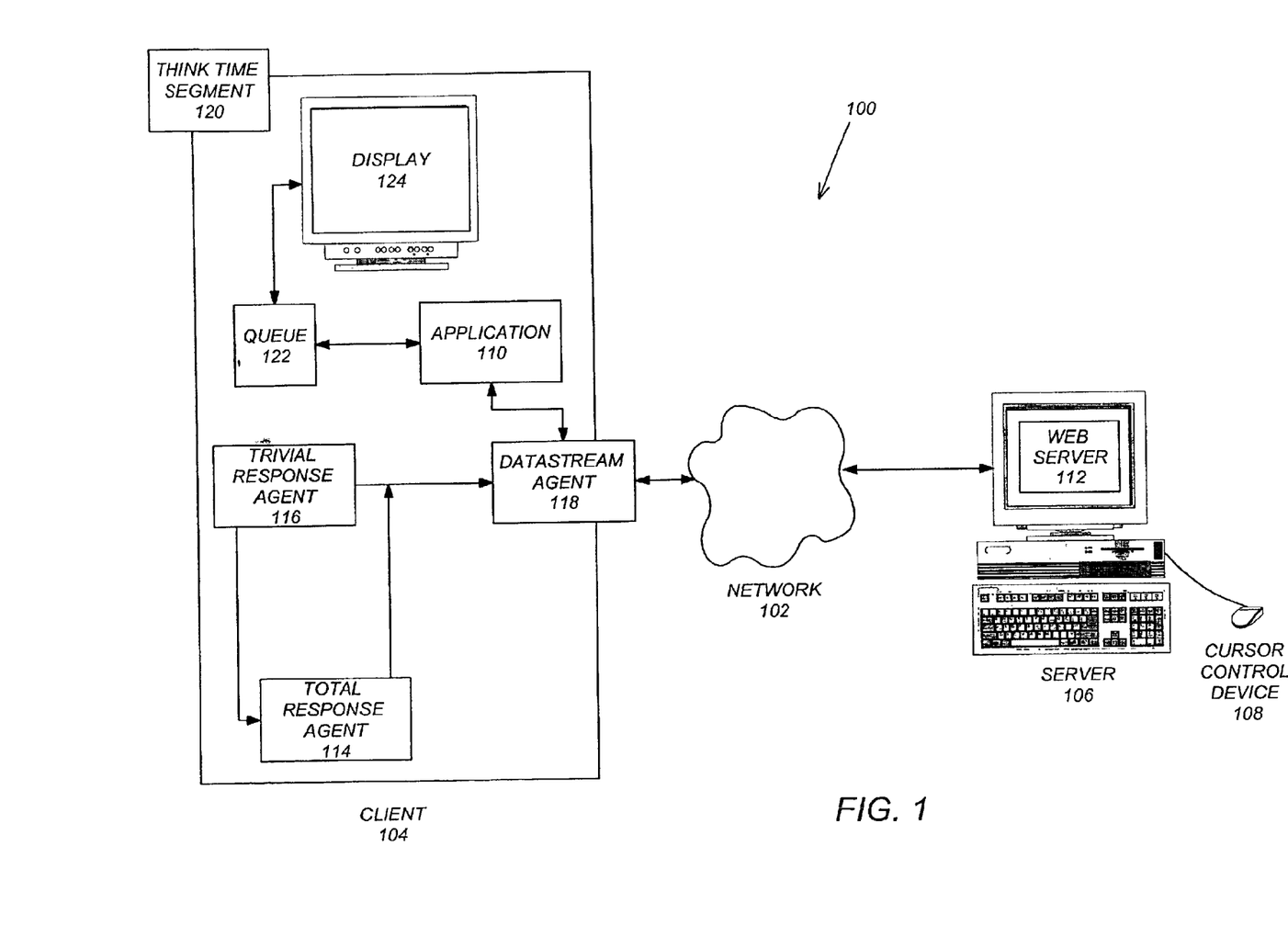
FIG. 1 schematically illustrates a hardware and software environment in accordance with one or more embodiments of the invention.

FIG. 1 schematically illustrates a hardware and software environment in accordance with one or more embodiments of the invention, and more particularly, illustrates a typical distributed computer system 100 using a network 102 to connect client computers 104 to server computers 106. A typical combination of resources may include a network 102 comprising the Internet, LANs, WANs, SNA networks, or the like, clients 104 that are personal computers workstations, minicomputers, etc., and servers 106 that are personal computers, workstations, minicomputers, mainframes, etc. Additionally, both client 104 and server 106 may receive input (e.g., cursor location input) and display a cursor in response to an input device such as cursor control device 108.

In accordance with one or more embodiments of the invention, network 102 (such as the Internet) connects client computers 104 executing applications 110 (e.g., a Web browser) to server computers 106 executing applications such as Web servers 112. In one or more embodiments of the invention, the application 110 is a Web browser such as NETSCAPE NAVIGATOR or MICROSOFT INTERNET EXPLORER. Further, software may be downloaded from server computer 106 to client computer 104 and installed as a plug in or ActiveX control of application 110. Web Server 106 may be a web server 106 currently available in the market such as the Web Server available from Netscape, the Internet Information Server (IIS) available from Microsoft, or the Web Server available from Apache.

In one or more embodiments of the invention, Web server 112 hosts an Active Server Page (ASP) or Internet Server Application Programming Interface (ISAPI) application that may be executing scripts. The scripts may invoke objects that execute business logic (referred to as business objects). The business objects may then manipulate data in a database. When a developer encapsulates business functionality into objects, the system may be referred to as a component object model (COM) system. Accordingly, the scripts executing on Web server 112 invoke COM objects that implement the business logic. Further, server 106 may utilize Microsoft's Transaction Server (MTS) to access required data stored in a database via an interface such as ADO (Active Data Objects), OLE DB (Object Ling and Embedding DataBase), or ODBC (Open DataBase Connectivity).

In one or more embodiments of the invention, additional applications (that may be implemented using hardware or software, for example) such as total response time agent 114, trivial response time agent 116, and datastream agent 118 execute in cooperation with client 104. Total response time agent 114 and trivial response time agent 116 are software agents written in a suitable programming language that is applicable to the computer hardware and software environment that segmented response time measurement is to take place on. For example, the computing environment may be Microsoft Windows 95, Windows 98, Windows NT 4.0, Windows ME, Windows 2000, etc. operating systems. In accordance with one or more embodiments of the invention, agents 114, 116, and 118 work in conjunction with any operating system currently available or that may be available in the future. Software agents 114–118 may be written in any programming language currently available (e.g., C or C++) or that may be available in the future. For example, any programming language that is capable of addressing operating system metrics, sending and receiving data over a network (e.g., a TCP/IP network), and/or reading and writing data to an external memory device (e.g., a hard drive) may be utilized.

A client 104— server 106 computer segment is a portion of a distributed computing environment that processes and routes computer requests from one location to another, typically over a complex computer network 102, with the caveat that these locations can be set physically apart. Each segment is typically made up of computing hardware and computer programs for the purpose of processing and routing these requests. The real-time that is utilized by a computing segment is also referred to in the computer industry as the segment's response time. Understanding the response time of several related computer segments is also known as segmentation.

The operation/execution of applications, devices, and components of system 100 may be viewed with respect to segmentation and segments. Processing performed by client 104 is said to be in the client 104 segment of computing. Network 102 requests that are sent and received to and from the client 104 segment and processed by network 102 software (commercial or otherwise), is said to be part of a network 102 segment. Processing that takes place by the server 106, on behalf of the client 104 segment's processing, is said to be part of the server 106 segment. Time spent at the client 104 segment, after the network 102 segment and server 106 segment have processed their requests, is part of the client 104 think tire segment 120.

Generally, components 110–118 all comprise logic and/or data that is embodied in or retrievable from a device, medium, signal, or carrier, e.g., a data storage device, a data communications device, a remote computer or device coupled to the computer across a network 102 or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, different software, and different devices, may be used to implement the present invention, so long as functionality as described below are performed thereby.

Software Components

A method for measuring response time of one or more several related computing segments in a client 104/server 106 computer environment is provided that is based directly on measuring one or more of the segments and using a statistical technique, derive the response time for several of the other segments. A final segment, the total of all segment response times, may also be computed.

The one or more segments that can be derived by a single direct measurement are client 104 response time, network 102 response time, server 106 response time, total end-to-end response time, and client think time 120. Each of these segments may be calculated and derived by directly measuring the client 104 segment using a software measurement agent. Accordingly, the client 104 segment and total response time may be directly measured at one physical location. Thereafter, the network 102 segment, server 106 segment, and client 104 think time segment 120 may be derived.

Directly Measuring Total Response Time

To derive the response time for a segment, the total response time must be directly measured first at the client 104. The total response time agent 114 is responsible for directly measuring the total response time. The total response time is equivalent to the summation of the following derived values: client 104 segment time+network 102 segment time+server 106 segment time.

Total response time measurement for a computer program begins with the activation of an event at client 104. For example, the cursor control device 108 (e.g., a computer mouse), ENTER key, or other valid keyboard key may be depressed at client 104. The event activation causes one or more requests to travel over the network 102 and induces server 106 to process the request. Total response time measurement ends when the server 106 completes processing, sends the results back over network 102, then onto the client 104 where the client 104 processes the results (e.g., by presenting the results onto a computer display).

For the purpose of measuring total response time, a method is needed to capture the activation of an event (e.g., computer Mouse and Keyboard events) as they are acted upon and displayed on a computer display. For example, in one or more embodiments of the invention, the Window's WINSETHOOK Application Program Interface (API) may be used. A similar API exists and may be utilized for operating systems that are not manufactured by Microsoft under the Windows or NT logo. The use of the WINSETHOOK API technique is further illustrated in U.S. patent application Ser. No. 09/428,271, filed Oct. 27, 1999 entitled "END-TO-END RESPONSE TIME MEASUREMENT FOR COMPUTER PROGRAMS USING STARTING AND ENDING QUEUES", by Paul F. Klein et al., now U.S. Pat. No. 6,202,036, issued Mar. 13, 2001, which application is a continuation of U.S. Pat. No. 5,991,705, issued on Nov. 23, 1999, application Ser. No. 08/899,195, filed Jul. 23, 1997, entitled "END-TO-END RESPONSE TIME MEASUREMENT FOR COMPUTER PROGRAMS USING STARTING AND ENDING QUEUES," by Paul F. Klein et al., which applications are fully incorporated by reference herein.

Total response time agent 114 is responsible for measuring the total response time and implementing any measurement techniques. For example, total response time may be measured by Windows Events and Network Packet flows.

Operating Systems (e.g., Windows 95, Windows 98 and NT 4.0) may utilize message queues 122 to move data between computer hardware (e.g., display 124) and software (e.g., application 110). Various components (e.g., the WINSETHOOK feature) may be utilized to capture the message as they arrive and depart a message queue 122. When an event activation occurs (e.g., a mouse 108 click or Keyboard event), signaling the start of a transaction, a message may be placed on the application's 110 message queue 122. A timestamp is taken when this event occurs and becomes the starting time for the transaction. When the results of the transaction return from the server 106, the results arrive at message queue 122 first, and may then be utilized by other applications, hardware (e.g., placed on the display 124), etc. after completing the transaction. An ending timestamp is taken when the transaction results are placed on message queue 122. The difference is the total response time. Messages placed on a message queue 122 may be referred to as events or "Windows Events".

As a software agent, datastream agent 118 sits logically between the client segment 104 and the network segment 102 as a datastream "sniffer" or "watcher". The job of datastream agent 118 is to intercept the TCP/IP (transmission control protocol/internet protocol) network 102 packets as they flow into and out of the client segment 104 for the purpose of calculating a timestamp indicating packet arrival time, count of packets as well as packet sizes in bytes. Datastream agent 118 may be implemented in a variety of manners. Two of such manners are described herein. In one or more embodiments, datastream agent 118 comprises a TCP/IP Network filter that is part of the TCP/IP Network Stack that is part of most all-commercial TCP/IP implementations. Alternatively, in one or more embodiments, datastream agent comprises a WINSOCK2 Layered Service Provider of an operating system (e.g., WINDOWS 98 or NT 4.0).

Using datastream agent 118 (implemented using any available method), data representing a transaction flows through the datastream agent 118 and can be captured for the purpose of taking a timestamp. Thus, as data leaves the application 110 and enters the datastream agent 118—a starting timestamp is taken. An ending timestamp is taken when the transaction results flow back into the datastream agent 118 across network 102 from the server 106. The difference is calculated as the response time. However, with this technique, time spent in the client segment 104 is not captured.

Therefore, if the WINSETHOOK technique is utilized, the total response time is calculated or determined by taking a starting timestamp when an event activation (e.g., mouse 108 click) arrives at message queue 122 and taking an ending timestamp when the results arrive back from the server 106 and onto message queue 122.

Figure 2:
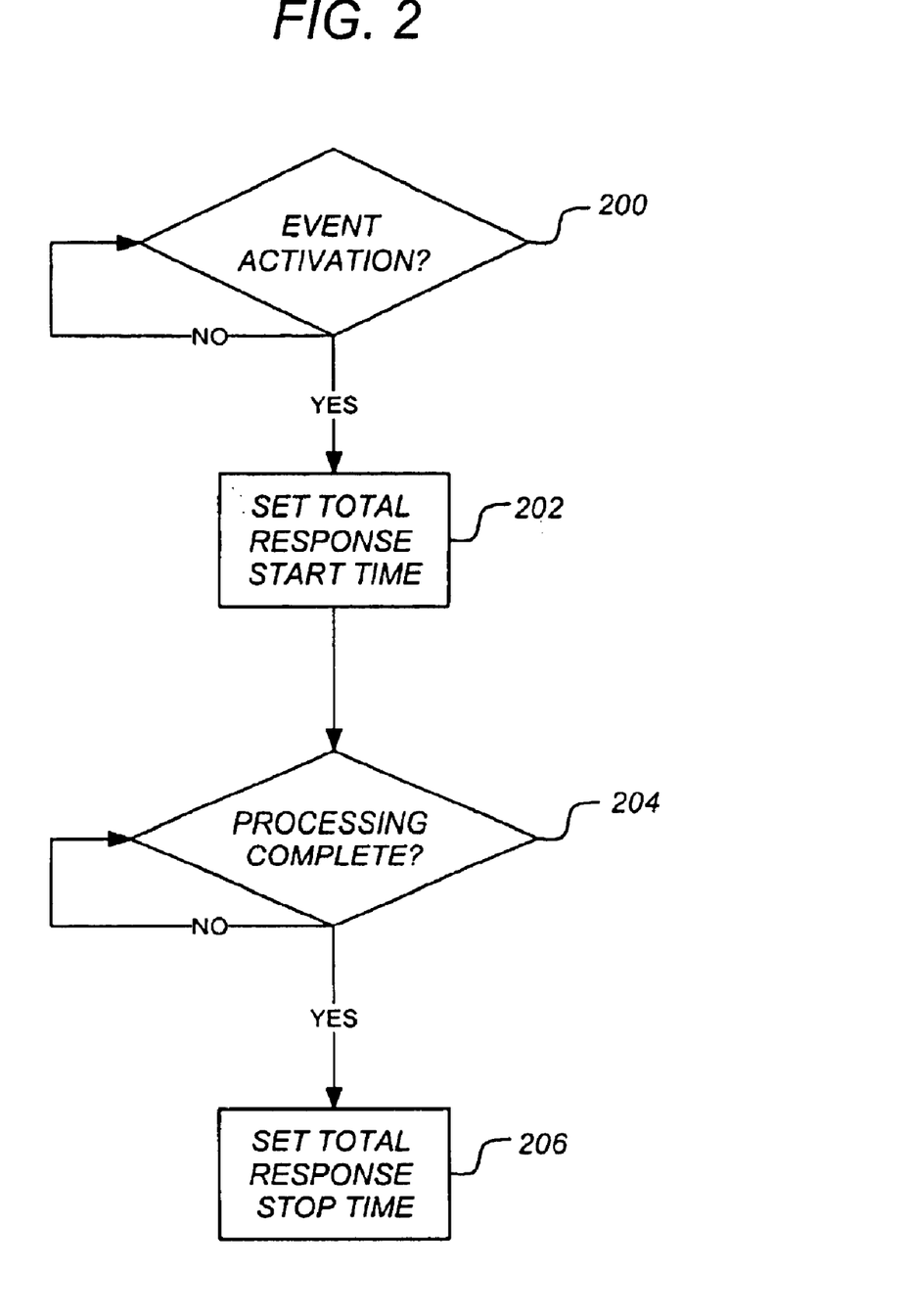
FIG. 2 is a flow chart illustrating the measurement of total response time in accordance with one or mote embodiments of the invention.

FIG. 2 is a flow chart illustrating the measurement of total response time in accordance with one or more embodiments of the invention. At step 200, total response agent 114 waits until an event activation (such as a mouse 108 or keyboard event). Once an event activation is detected, a start time is set at step 202. At step 204, total response agent 114 waits until processing has been completed and the results are set back over network 102 onto client 104. As described above, step 204 may be implemented using the WINSETHOOK API. Using such an implementation, processing may not be deemed complete until a message is received on message queue 122. Once processing is complete, the total response end/stop time is set at step 206.

Computing Client 104 Segment Time

The direct measurement of client 104 segment response/compute time begins when total response time agent 114 detects an event activation (e.g., a computer mouse 108 or keyboard event) signaling the start of a client 104 transaction.

As stated above, total response time agent 114 may utilize the WINSETHOOK API to measure the start of the client 104 transaction. Using the WINSETHOOK API, the event activation may be detected upon the arrival of a message on message queue 122. As this message queue 122 event occurs, total response time agent 114 sets a software timestamp. When the first network 102 event is detected by datastream agent 118 outbound toward network segment 102, an ending timestamp is generated for the client 104 segment. The difference between the two timestamps is the amount of time it took to process the request on the outbound leg of the client 104 segment.

In a similar fashion, the inbound results are treated the same way. Datastream agent 118 takes a timestamp when the last inbound network 102 flow is detected. Total response time agent 114 then takes a timestamp after the last update is presented to message queue 122 prior to further processing (e.g., presenting the information on display 124). The difference between the two timestamps is the amount of time it took to process the request on the inbound leg of the client 104 segment. The response time of the outbound client 104 segment time is added to the inbound client 104 segment time to get the total client 104 segment compute time.

Figure 3:
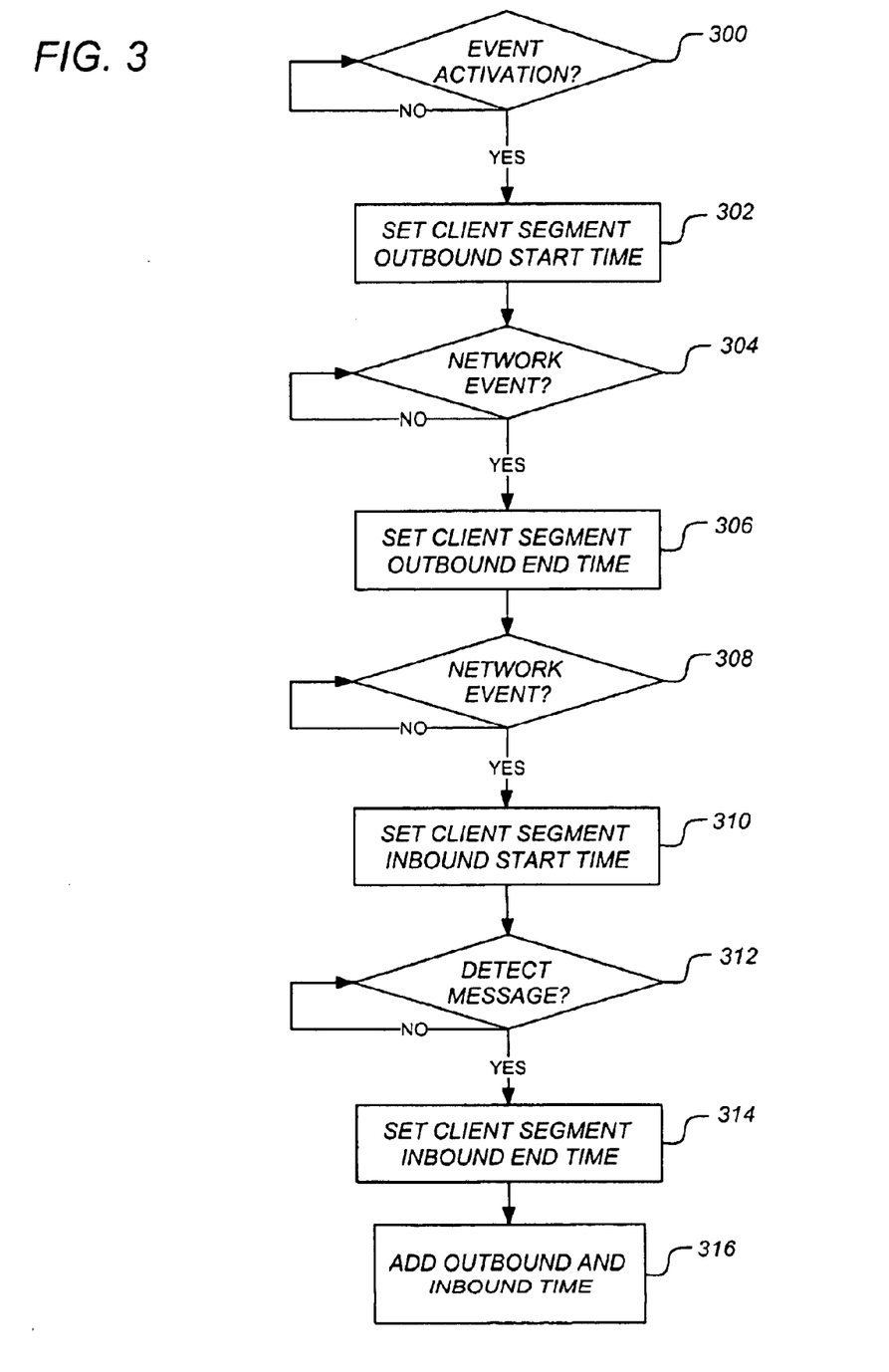
FIG. 3 is a flow chart illustrating the determination of a client segment compute time in accordance with one or more embodiments of the invention.

FIG. 3 is a flow chart illustrating the determination of the client 104 segment compute time in accordance with one or more embodiments of the invention. At step 300, total response agent 114 determines if an event (e.g., a mouse 108 click or keyboard event) has been activated on client 104. Once an event has been detected, a client segment outbound start time is set at step 302. At step 304, datastream agent 118 waits until a first network event is detected. Once detected, the client segment outbound end time is set at step 306. At step 308, datastream agent 118 waits to detect the results from the outbound request across network 102. Once an event is detected, datastream agent 118 sets the inbound start time at step 310. When processing is complete, a message is placed on message queue 122. Once the message is detected at step 312, the inbound end time is set at step 314. To compute the total client 104 segment compute time, the outbound time and inbound time are added at step 316.

Computing a Network 102 Segment's Trivial Response Time

Trivial response time agent 116 maintains information about how long it takes to make a trivial request, of a specific network packet size, to the server 106 and back again. A trivial request is one that causes a network packet to flow across network 102 to server 106 where server 106 does little or no computer processing because of it. Instead, all the server 106 does in response to this trivial request is to echo the network packet back to the client 104 where trivial response time agent 116 resides. Thus, almost all the time taken to accomplish this trivial request can be attributed to the network 102 since the server 106 does almost nothing. For this reason, the trivial request provides a good measure of the network 102 response time, for a given packet size, at a specified moment in time.

Trivial response time agent 116 calculates trivial response time by sending a trivial request packet to the server 106 on timed intervals. At every interval, a TCP/IP Network 102 ping (also called a ping and referred to as a trivial request) is sent to the server 106. Trivial response time agent 116 takes a timestamp before calling/sending the ping/trivial request packet and takes another after the ping/trivial request packet returns. The difference of these two timestamps, divided by two, is the network 102 segment trivial response time (also referred to as a trivial response time) to the server 106. Since networks 102 in general are very dynamic in load and response time, in one or more embodiments of the invention more than one trivial response time calculation may be taken and averaged to ensure a reliable trivial response time. In addition, time in the network 102 may vary by the size of the network 102 packet that flows over the network 102. Therefore, for each network 102 ping in a timed interval, several pings of various network 102 packet sizes may be transmitted as well. When embodiments utilize several pings, trivial response time agent 116 maintains a running average of trivial response times, not only by the number of pings, but also by the packet size of each ping.

Figure 4:
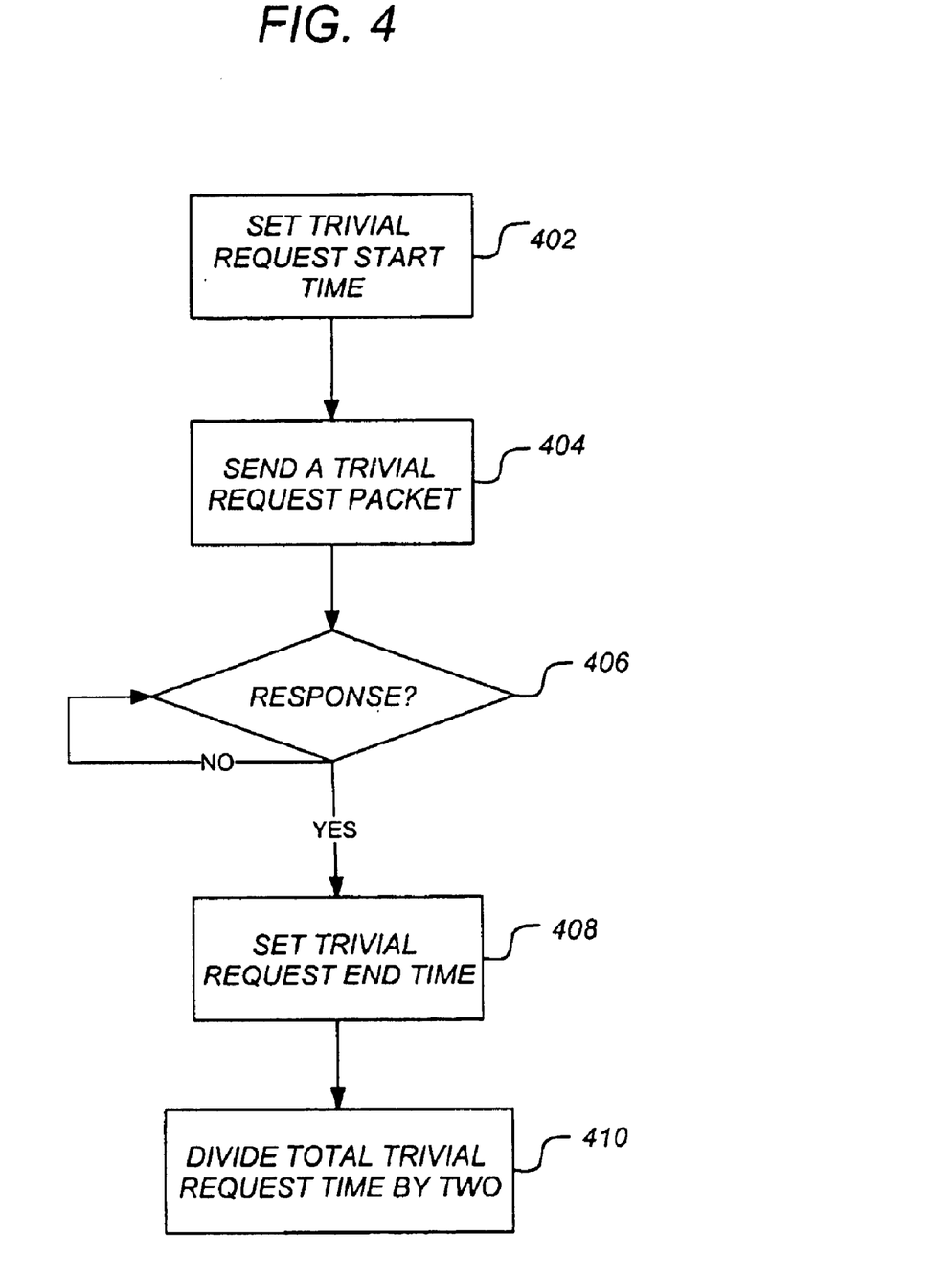
FIG. 4 is a flow chart illustrating the determination of a network segment's trivial response time in accordance with one or more embodiments of the invention.

FIG. 4 is a flow chart illustrating the determination of network 102 segment's trivial response time in accordance with one or more embodiments of the invention. At step 402, trivial response time agent 116 sets the trivial request start time. At step 404, trivial response time agent transmits a trivial request packet to server 106. Server echoes back the packet and trivial response agent 116 waits for a response at step 406. Once a response is received, trivial response agent 116 sets the trivial request end time at step 408. At step 410, the total trivial request time is divided by two to obtain the network 102 segment trivial response time.

Deriving Network 102 Segment Response Time

To derive the network 102 segment response time (also referred to as network response time), datastream agent 118 keeps track of network 102 packets that flow outbound from and inbound to client 104 that occur between a transaction starting event and its end. Accordingly, datastream agent 118 may maintain information about the number of network 102 packets that flow outbound from and inbound to client 104, the size of each packet, in bytes, that flow outbound from and inbound to client 104, and the response time of a trivial request to the server 106 as measured by trivial response time agent 116.

Once the response time that is measured by the total response time agent 114 has completed, the network 102 response time can be derived. Using information in the above statements, for each packet viewed as going outbound and inbound from the client 104, the size of the network 102 packet is matched with a packet of an equal size measured by the trivial response time agent 116. If the two network 102 packets flowed over the network 102 at approximately the same time, they should have had the same response times. Thus, all of the matched trivial times may be added (by datastream size) of all discrete network 102 packets collected by datastream agent 118 to derive the network 102 segment response time.

As a practical matter, trivial response time agent 116 may not measure every size packet that flows over network 102. If trivial response time agent 116 did record every measurement, the trivial measurement agent 116 could become intrusive to the network 102 and actually degrade the network 102 response time. Therefore, when matching a network 102 packet size collected from datastream agent 118 to that of a trivial response time collected by the trivial response time agent 116, a "best fit" technique may be used. In a "best fit" technique, the trivial packet size that most closely matches the network 102 packet size, but is just larger, is interpolated in a linear fashion to the actual network 102 packet size. For example, the following interpolation technique may be used in accordance with one or more embodiments of the invention:

Derived Response Time=(Trivial Packet size)/(Actual Packet size)*(Trivial Response Time)

One or more situations may govern the accuracy of computing the derived response time in the above example. If any of the situations are not accounted for, the value for derived response time may be off by several hundred percent. Accordingly, situations that may need to be considered include:

(a) Response time as measured by the trivial response time agent 116 may or may not be done several times and for various network 102 packet sizes. The use of several measurements and packet sizes may provide more accurate results;

(b) When matching actual network 102 packet sizes as measured by datastream agent 118 and trivial response time agent 116 packet sizes, the match may only be valid if the two network 102 packet flows occurred at approximately the same moment in time (or within some short time interval). Accordingly, attempt to match packets that occur within a short time interval; and (c) Matching of network packet sizes from datastream agent 118 and trivial response time agent 116 may be inaccurate if the measurement is outside of a predefined range or bounds. Meaning, if datastream agent 118 has a packet size much larger than the largest trivial response time measured—a much larger margin of error may occur when deriving response time.

Under normal network 102 conditions, as seen in standard industry network 102 implementations, the above-identified situations may pose little problem to measuring network 102 response time.

Another possible source of derivation error can occur when the network 102 segment response time and the server 106 are actually close to being equal and of very small time value (e.g., less than one second or two). It may be possible to derive a network 102 segment response time larger than the measured total response time due to interpolation error. In this case, one or more embodiments of the invention may divide the derived time by two and use that number for the network 102 segment time since in this situation—the times were equal to being with.

Still another possible source of derivation error can occur when the actual network 102 segment's response time varies wildly at various network 102 moments. To adjust for this situation, trivial response time agent 116 may calculate responses more frequently. Accordingly, trivial response time measurements may be made twice or more times during the actual network 102 activity within the bounds of the client 104 transaction. In one or more embodiments, in addition to pinging the network 102 on an interval, the network 102 may be pinged based on a specified number of packets (e.g., every five (5) or more packets) that flows during the transaction. Thereafter, the largest trivial response time measured is used to compute the network 102 segment response time.

Figure 5:
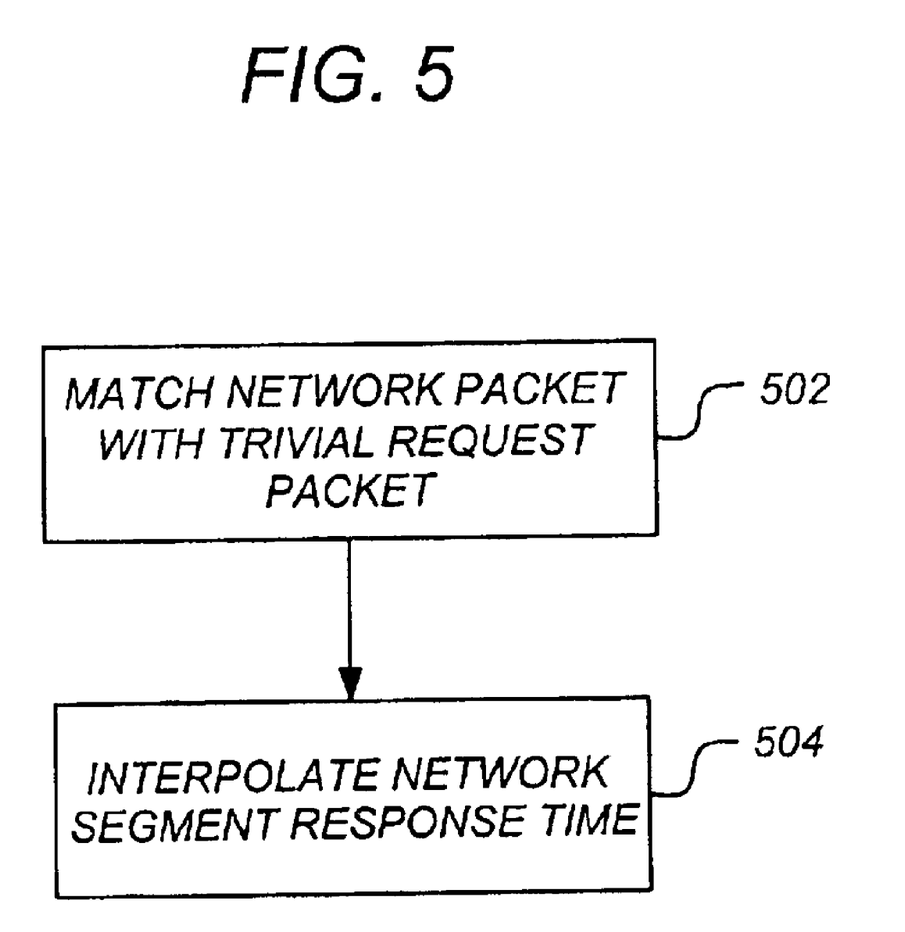
FIG. 5 is a flow chart illustrating the determination of a network segment response time in accordance with one or more embodiments of the invention.

FIG. 5 is a flow chart illustrating the determination of the network 102 segment response time in accordance with one or more embodiments of the invention. At step 502, a network 102 packet is matched with a trivial request packet as described above. At step 504, the network 102 segment response time is interpolated as described above.

Deriving Server 106 Segment Response Time

To derive server 106 segment response time, the total response time as calculated by the total response time agent 114 is subtracted from the network 102 segment response time. Additionally, the client 104 segment response time is subtracted from the result:

Server 106 Segment Response Time=(Total Response Time from Agent 114))−
(Network 102 Segment response time)−
(Client 104 Segment Response Time)

Deriving Think Time Segment 120 Response Time

The think time segment 120 is the time that a client 102 takes to think or activate another action once presented with information. To derive the think time segment 120 response time, total response time agent 114 takes a timestamp when an ending event updates the message queue 122 (e.g., prior to updating a computer display 124). Total response time agent 114 takes another timestamp when a second client 104 event is activated (e.g., when a computer mouse 108 or keyboard event arrives at message queue 122) indicating the start of a new client 104 request. The difference between these two timestamps is the think time segment 120 response time.

CONCLUSION

This concludes the description of one or more embodiments of the invention. In summary, one or more embodiments of the invention derive response times for various processing and routing segments in a client 104/server 106 computer environment by directly measuring one segment of the environment. Accordingly, a client segment compute time, network segment compute time, server segment response time, and think time segment response time may be determined by measuring. Deriving response times as opposed to directly measuring response times provides many advantages. Such advantages are further enhanced when the computer environment is such that these segments are not physically located together or that the segments are designed in a way that does not allow direct measurement.

Since the total response time of any computer request is the sum of each segment that a request travels over, being able to identify a computer segment with poor response time for the purpose of repairing or reworking may be useful in the efficient operation of any computer network.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of determining response times of computing segments in a client-server computer environment comprising:
    (a) determining a client segment compute time by:
        (1) obtaining, at a client, an outbound time between an activation of a first client event and a detection of an outbound message outbound to a network;
        (2) obtaining, at the client, an inbound time between a detection of an inbound result from the network and an arrival of the inbound result on a message queue;
        (3) obtaining the client segment compute time by adding the outbound time and the inbound time;
    (b) determining a network segment trivial response time by:
        (1) obtaining a total trivial time for a packet between a time prior to sending a trivial request packet from the client to a server to a time after the response is received at the client from the server;
        (2) obtaining network segment trivial response time by dividing the total trivial request time by two;
    (c) determining a network segment response time by matching a network packet with a trivial request packet based on a size of the network packet and a size of the trivial request packet, wherein the network segment response time is based on the network segment trivial response time corresponding to the matched trivial request packet;
    (d) determining a server segment response time by subtracting the network segment response time and the client segment compute time from a total response time; and
    (e) determining a think time segment response time based on the difference between a time of the arrival of the inbound result on the message queue and the activation of a second client event.

2. The method of claim 1 wherein the determining a network segment trivial response time further comprises averaging multiple network segment trivial response times.

3. The method of claim 2 wherein averages are based on a packet size.

4. The method of claim 1 wherein two or more packets are matched and averaged to determine the network segment response time.

5. The method of claim 1 wherein the packets are matched by determining the trivial request packet size that most closely matches the network packet size.

6. The method of claim 1 wherein the network segment response time is a derived time that is interpolated by dividing the trivial request packet size by the network packet size and multiplying by the trivial request response time.

7. The method of claim 6 wherein the network segment response time is obtained by dividing the derived time by two.

8. The method of claim 1 wherein the matched packets were transmitted at approximately the same moment in time.

9. The method of claim 1 wherein a trivial request is transmitted at regular intervals based on a number of packets that are transmitted.

10. The method of claim 1 wherein the total response time comprises the time between the activation of an event and the arrival of the inbound result on the message queue.

11. A method of determining a client segment compute time comprising:
    obtaining, at a client, an outbound time between activation of a first client event and a detection of an outbound message outbound to a network;
    obtaining, at the client, an inbound time between a detection of an inbound result from the network and a arrival of the inbound result on a message queue; and
    obtaining the client segment compute time by adding the outbound time and the inbound time.

12. A method of determining a network segment response time comprising:
    obtaining a total response time as a total time from activating an event at a client, detecting an outbound message outbound to a network, transmitting a first network packet having an actual first packet size from the client to a server, and arrival of an inbound result on a message queue at the client from the server;
    obtaining a total trivial time for a trivial request packet between a time prior to sending the trivial request packet from the client to the server to a time after a response is received at the client from the server;
    obtaining a network segment trivial response time by dividing the total trivial request time by two;
    matching the first network packet with a trivial request packet based on the actual size of the first network packet and a size of the trivial request packet; and
    deriving the network segment response time from the total response time as the network segment trivial response time corresponding to the matched trivial request packet.

13. The method of claim 12 further comprising averaging multiple network segment trivial response times.

14. The method of claim 13 wherein the averages are based on a packet size.

15. The method of claim 12 wherein two or more packets are matched and averaged to determine the network segment response time.

16. The method of claim 12 wherein the packets are matched by determining the tivial request packet size that most closely matches the network packet size.

17. The method of claim 12 wherein the network segment response time is a derived time that is interpolated by dividing the trivial request packet size by the network packet size and multiplying by the trivial request response time.

18. The method of claim 17 wherein the network segment response time is obtained by dividing the derived time by two.

19. The method of claim 12 wherein the matched packets were transmitted at approximately the same moment in time.

20. The method of claim 12 wherein a trivial request is transmitted at regular intervals based on a number of packets that are transmitted.

21. A method of determining a server segment response time by subtracting a network segment response time and a client segment response compute time from a total response time.

22. The method of claim 21 wherein the total response time comprises a time between an activation of an event and an aural of an inbound result on a message queue.

23. A method of determining a think time segment response time by determining a difference between a time of an arrival of an inbound result on a message queue at a client and an activation of a second client event at the client.

24. A system for determining a client segment compute time comprising:

(a) a total response time agent configured to:
  (1) set a starting software timestamp for an outbound time upon the activation of a first client event;
  (2) set an ending software timestamp for an inbound time upon an arrival of an inbound result on a message queue;
(b) a datastream agent configured to:
  (1) set an ending software timestamp for the outbound time upon detecting an outbound message outbound to a network;
  (2) set a starting software timestamp for the inbound time upon detecting the inbound result from a network;
(c) a client configured to obtain a client segment compute time by adding the outbound time and the inbound time.

25. A system for determining a network segment response time comprising:
(a) a total response time agent configured to obtain a total response time as a total time from activating an event at a client, detecting an outbound message outbound to a network, transmitting a first network packet having an actual first packet seize from the client to a server, and arrival of an inbound result on a message queue at the client from the server;
(b) a trivial response time agent configured to:
  (1) obtain a total trivial time for a trivial request packet between a time prior to sending the trivial request packet from the client to the server to a time after a response is received at the client from the server;
  (2) obtaining a network segment trivial response time by dividing the total trivial request time by two;
(b) a datastream agent configured to maintain information about the first network packet transmitted from the client to the server;
(c) the client configured to;
  (1) match the network packet with a trivial request packet based on the actual size of the first network packet and a size of the trivial request packet; and
  (2) derive the network segment response time from the total response time as the network segment trivial response time corresponding to the matched trivial request packet.

26. The system of claim 25 wherein the trivial response time agent is further configured to average multiple network segment tivial response times.

27. The system of claim 26 wherein the averages are based on a packet size.

28. The system of claim 25 wherein the client is further configured to match and average two or more packets to determine the network segment response time.

29. The system of claim 25 wherein the packets are matched by determining the trivial request packet size that most closely matches the network packet size.

30. The system of claim 25 wherein the network segment response time is a derived time that is interpolated by dividing the trivial request packet size by the network packet size and multiplying by the trivial request response time.

31. The system of claim 30 wherein the client is further configured to obtain the network segment response time by dividing the derived time by two.

32. The system of claim 25 wherein the matched packets were transmitted at approximately the same moment in time.

33. The system of claim 25 wherein the tivial response time agent is configured to transmit a trivial request at regular intervals based on a number of packets that are transmitted.

34. A system for determining a server segment response time comprising:
a total response time agent configured to obtain a total response time for a computer program wherein the total response time is the time between a activation of an event and arrival of an inbound result on a message queue; and
a client configured to subtract a network segment response time a client segment response compute time from the total response time.

35. A system for determining a think time segment response time comprising:
a client; and
a total response time agent of the client configured to determine a difference between a time of an arrival of an inbound result on a message queue at the client and an activation of a second client event at the client.

36. An article of manufacture embodying logic for performing a method of determining a client, segment compute time, the method comprising:
obtaining, at a client, an outbound time between an activation of a first client event and a detection of an outbound message outbound to a network;
obtaining, at the client, an inbound time between a detection of an inbound result from the network and an arrival of the inbound result on a message queue; and
obtaining the client segment compute time by adding the outbound time and the inbound time.

37. An article of manufacture embodying logic for performing a method of determining a network segment response time, the method comprising:
obtaining a total response time as a total time from activating an event at a client, detecting an outbound message outbound to a network, transmitting a first network packet having an actual first packet size from the client to a server, and an arrival of an inbound result on a message queue at the client from the server;
obtaining a total trivial time for a trivial request packet between a time prior to sending the trivial request packet from the client to the server to a time after a response is received at the client from the server;
obtaining a network segment trivial response time by dividing the total trivial request time by two;
matching the first network packet with a trivial request packet based on the actual size of the first network packet and a size of the trivial request packet; and
deriving the network segment response time from the total response time as the network segment trivial response time corresponding to the matched trivial request packet.

38. The article of manufacture of claim 37, the method further comprising average multiple network segment trivial response times.

39. The article of manufacture of claim 38 wherein the averages are based on a packet size.

40. The article of manufacture of claim 37 wherein the method matches and averages two or more packets to determine the network segment response time.

41. The article of manufacture of claim 37 wherein the method matches the packets by determining the trivial request packet size that most closely matches the network packet size.

42. The article of manufacture of claim 37 wherein the network segment response time is a derived time that the method interpolates by dividing the trivial request packet size by the network packet size and multiplying by the trivial request response time.

43. The article of manufacture of claim 42 wherein the method obtains the network segment response time by dividing the derived time by two.

44. The article of manufacture of claim 37 wherein the matched packets were transmitted at approximately the same moment in time.

45. The article of manufacture of claim 37 wherein a trivial request is transmitted at regular intervals based on a number of packets that are transmitted.

46. An article of manufacture embodying logic for performing a method of determining a server segment response time, the method comprising subtracting a network segment response time and a client segment response compute time from a total response time.

47. The method of claim 46 wherein the total response time comprises a time between an activation of an event and an arrival of an inbound result on a message queue.

48. An article of manufacture embodying logic for performing a method of determining a think time segment response time, the method comprising determining a difference between a time of an arrival of an inbound result on a message queue at a client and an activation of a second client event at the client.

* * * * *

UNITED STATES PATENT AND TRADEMARK OFFICE
CERTIFICATE OF CORRECTION

PATENT NO. : 6,917,971 B1
DATED : July 12, 2005
INVENTOR(S) : Klein

It is certified that error appears in the above-identified patent and that said Letters Patent is hereby corrected as shown below:

Column 12,
Line 60, "aural" should read -- arrival --.

Column 13,
Lines 46 and 64, "tivial" should read -- trivial --.

Column 14,
Line 5, "a" should read -- an --.
Line 9, "a" should read -- and --.
Line 19, "client, segment" should read -- client segment --.
Line 52, "average" should read -- averaging --.

Signed and Sealed this

Twenty-seventh Day of December, 2005

JON W. DUDAS
*Director of the United States Patent and Trademark Office*